(12) United States Patent
Bonhote et al.

(10) Patent No.: US 8,028,400 B2
(45) Date of Patent: Oct. 4, 2011

(54) METHOD FOR MANUFACTURING A MAGNETIC WRITE HEAD

(75) Inventors: Christian Rene Bonhote, San Jose, CA (US); Jeffrey S. Lille, Sunnyvale, CA (US); Scott Arthur MacDonald, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 881 days.

(21) Appl. No.: 12/043,381

(22) Filed: Mar. 6, 2008

(65) Prior Publication Data

US 2009/0226760 A1 Sep. 10, 2009

(51) Int. Cl.
*G11B 5/127* (2006.01)
*H04R 31/00* (2006.01)

(52) U.S. Cl. .............. 29/603.16; 29/603.11; 29/603.13; 29/603.14; 29/603.15; 29/603.18; 216/62; 216/66; 216/67; 360/121; 360/122; 360/317; 427/127; 427/128; 451/5; 451/41

(58) Field of Classification Search ............... 29/603.11, 29/603.13–603.16, 603.18; 205/223; 216/22, 216/39, 41, 48, 62, 65–67; 360/121, 122, 360/317; 427/127, 128; 451/5, 41
See application file for complete search history.

(56) References Cited

U.S. PATENT DOCUMENTS

| | | | |
|---|---|---|---|
| 5,066,616 A * | 11/1991 | Gordon | 430/272.1 |
| 7,186,348 B2 | 3/2007 | Chen et al. | 216/22 |
| 7,371,400 B2 * | 5/2008 | Borenstein et al. | 424/423 |
| 2003/0170571 A1 | 9/2003 | Nozaki et al. | 430/314 |
| 2006/0096081 A1 | 5/2006 | Bonhote et al. | 29/603.18 |
| 2007/0020386 A1 | 1/2007 | Bedell et al. | 427/128 |
| 2007/0106021 A1 | 5/2007 | Kozawa et al. | 525/61 |
| 2007/0139816 A1 | 6/2007 | Chen et al. | 360/110 |
| 2007/0224537 A1 | 9/2007 | Nozaki et al. | 430/270.1 |

* cited by examiner

*Primary Examiner* — Paul D Kim
(74) *Attorney, Agent, or Firm* — Zilka-Kotab, PC

(57) ABSTRACT

A method for forming a tapered, electroplated structure. The method involves forming a first mask structure having an opening. A shrink material is deposited into the opening, such that the thickness of the shrink material is less than the thickness of the first mask structure. The first mask structure and the shrink material are then heated causing the sides of the opening in the mask structure to bulge inward. The shrink material is then removed, and a first electrically conductive material can then be electroplated into the opening to a thickness that is much less than the thickness of the mask. The bulbous shaped of the deformed photoresist mask forms a taper on the first electrically conductive material. The first mask can then be removed and a second electrically conductive material can be electroplated over the first electrically conductive material.

17 Claims, 17 Drawing Sheets

METHOD FOR MANUFACTURING A MAGNETIC WRITE HEAD

FIELD OF THE INVENTION

The present invention relates to perpendicular magnetic recording and more particularly to a magnetic write head having a tapered, electroplated trailing magnetic shield.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a method for forming a tapered, electroplated structure. The method involves forming a first mask structure having an opening. A shrink material is deposited into the opening, such that the thickness of the shrink material is less than the thickness of the first mask structure. The first mask structure and the shrink material are then heated causing the sides of the opening in the mask structure to bulge inward. The shrink material is then removed, and a first electrically conductive material can then be electroplated into the opening to a thickness that is much less than the thickness of the mask. The bulbous shaped of the deformed photoresist mask forms a taper on the first electrically conductive material. The first mask can then be removed and a second electrically conductive material can be electroplated over the first electrically conductive material. The tapered edge of the first electrically conductive material forms an inverted taper on the second electrically conductive material.

This method can be employed to form a magnetic trailing shield having a back edge that tapers away from the air bearing surface (ABS) with increasing distance from the write pole (in the trailing direction). In this way, the a tapered trailing shield can be formed that has a trailing shield throat height that is small near the write pole, but which increases with increasing distance in the trailing direction.

This advantageously prevents saturation of the trailing shield, while also minimizing the amount of magnetic flux that is lost from the write pole to the trailing shield (thereby maximizing write field strength). This tapered shape also eliminates the possibility of voids or holes being formed in the trailing shield as a result of process variations.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
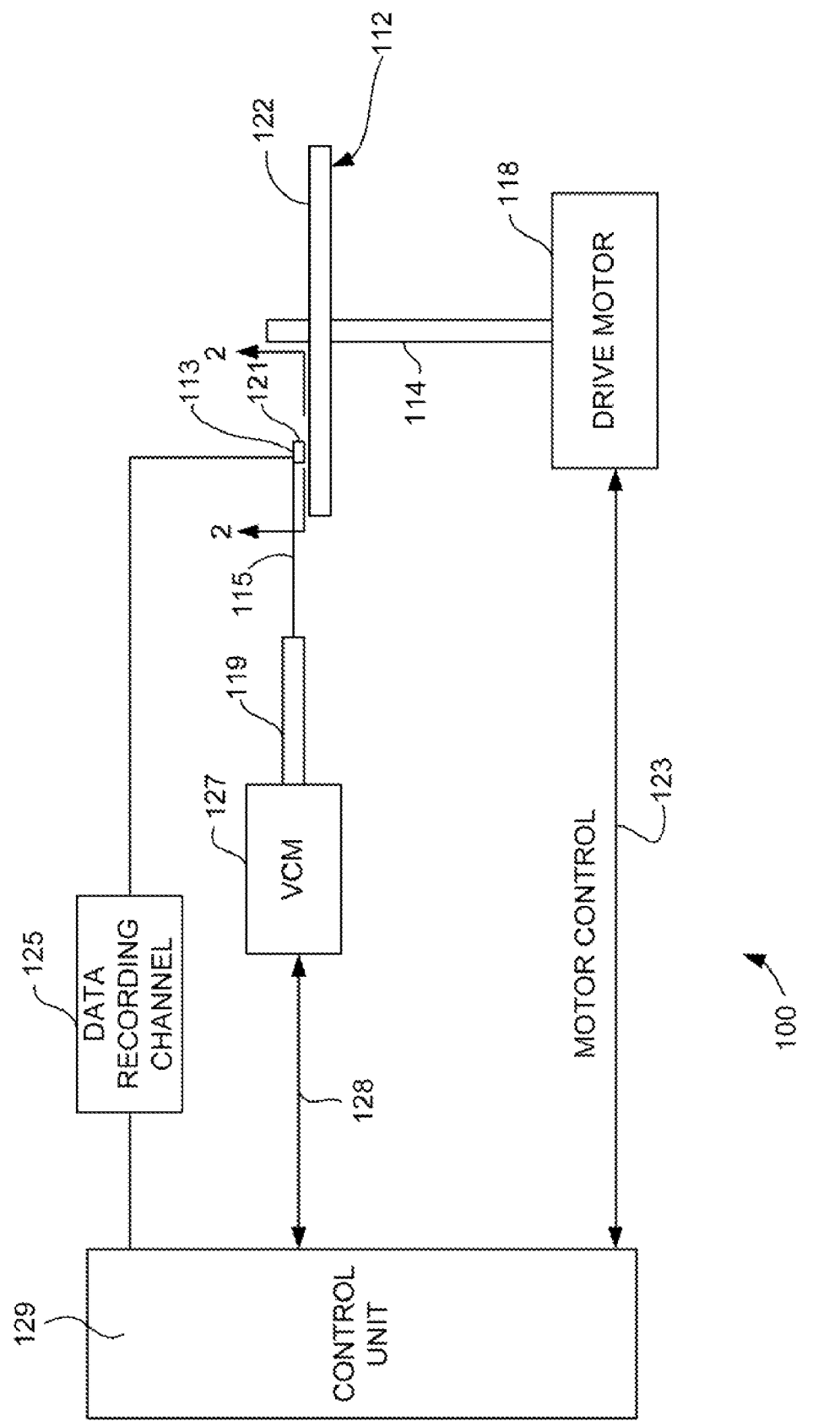
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
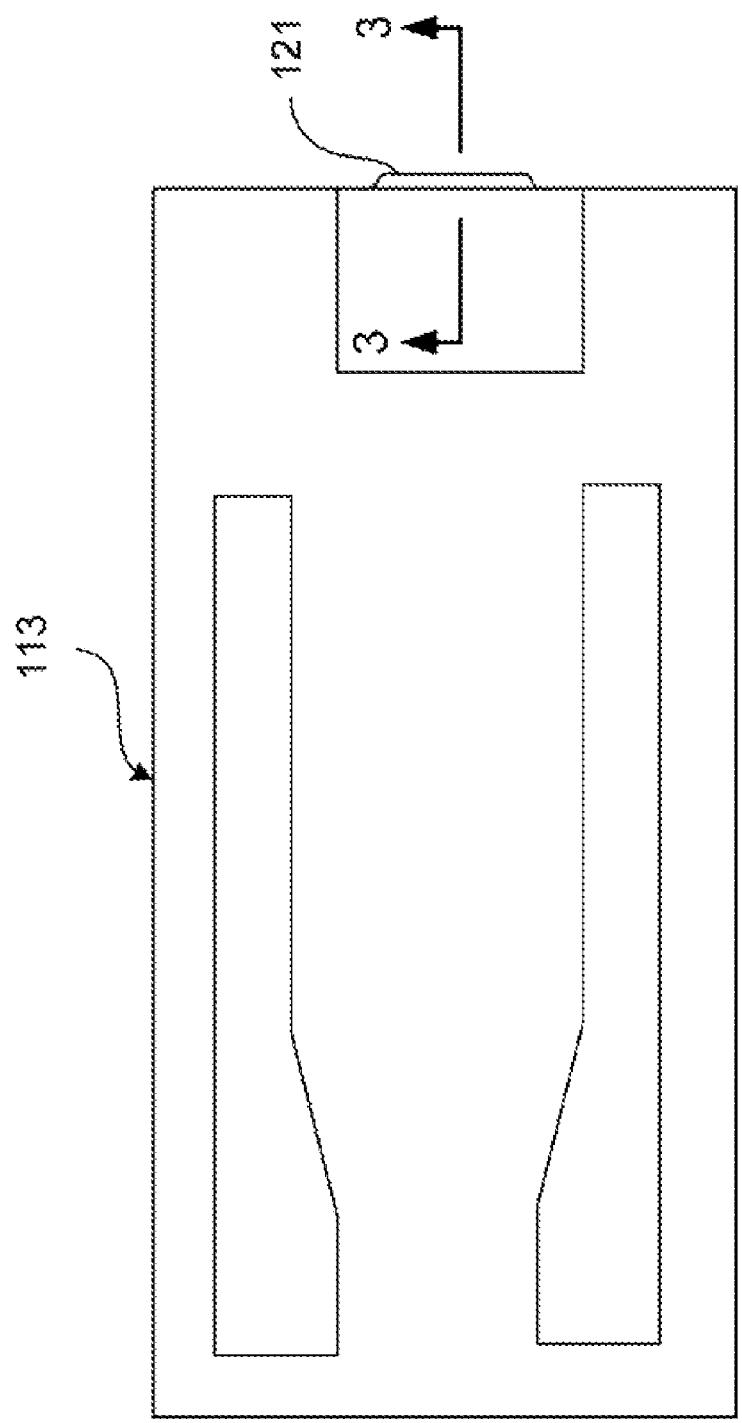
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
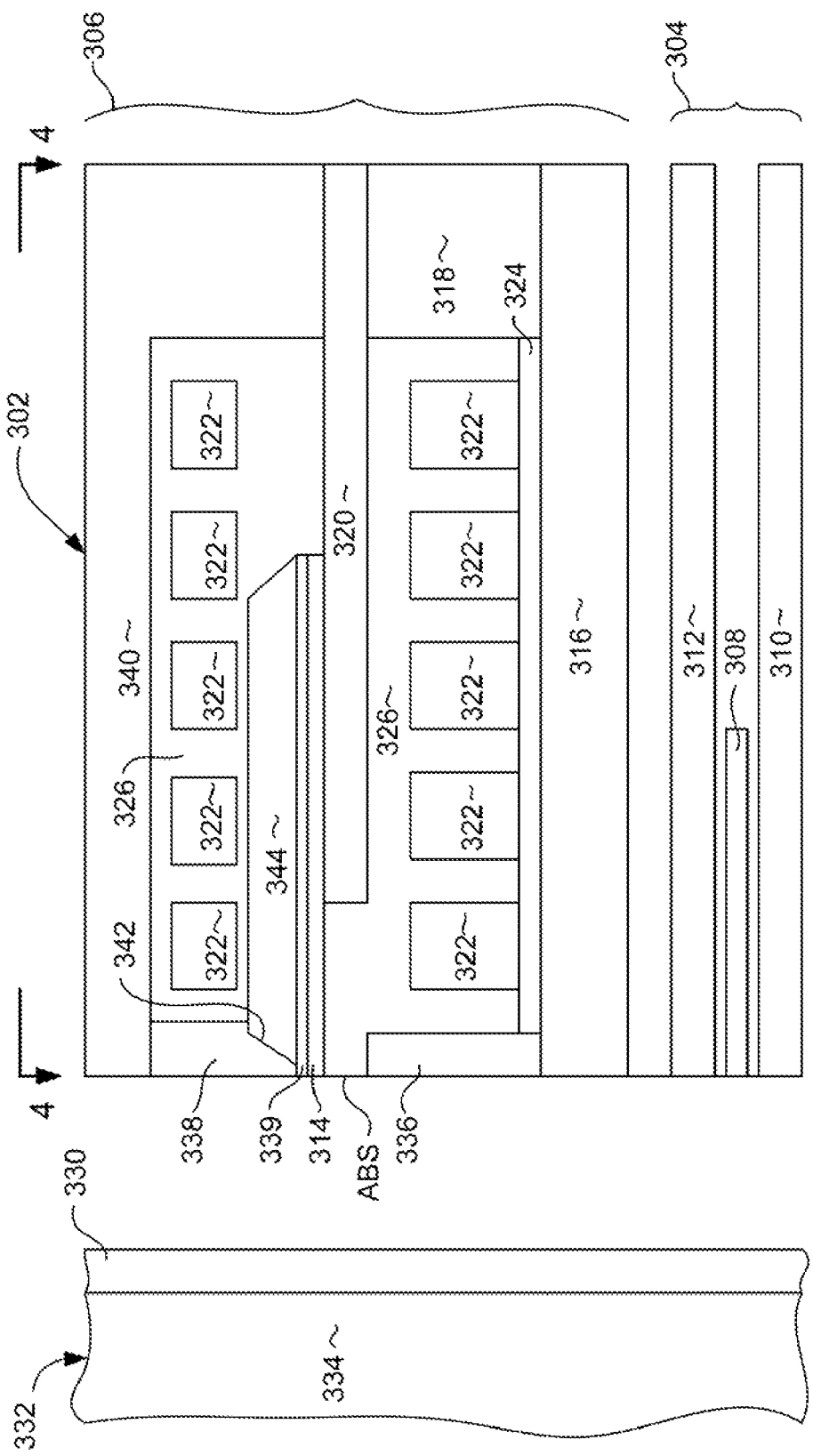
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3A) passes between the write pole and shaping layer 314, 320 and the return pole 316, and may also pass above the write pole 314 and shaping layer 320. The write coil 322 can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322. A resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under layer 334, and returns back to the return pole 316, where it is sufficiently spread out and weak that it does not erase the data bit recorded by the write head 314. A magnetic pedestal 336 can be provided at the ABS and connected with the return pole to prevent magnetic fields, such as from the coil 322 from inadvertently reaching the magnetic media 332.

In order to increase write field gradient, and therefore increase the speed with which the write head 306 can write data, a trailing, wrap-around magnetic shield 338 can be provided. The trailing, wrap-around magnetic shield 338 is separated from the write pole by a non-magnetic trailing gap 339, and may be connected with the shaping layer 320 and/or back gap 318 by a trailing return pole 340. The trailing shield 338 attracts the magnetic field from the write pole 314, which slightly cants the angle of the magnetic field emitting from the write pole 314. This canting of the write field increases the ability of the write head to write to high coercivity media. A trailing magnetic return pole 340 is provided and can be magnetically connected with the trailing shield 338. Therefore, the trailing return pole 340 can magnetically connect the trailing magnetic shield 338 with the back portion of the write head 306, such as with the back end of the shaping layer 320 and with the back gap layer 318.

Figure 4:
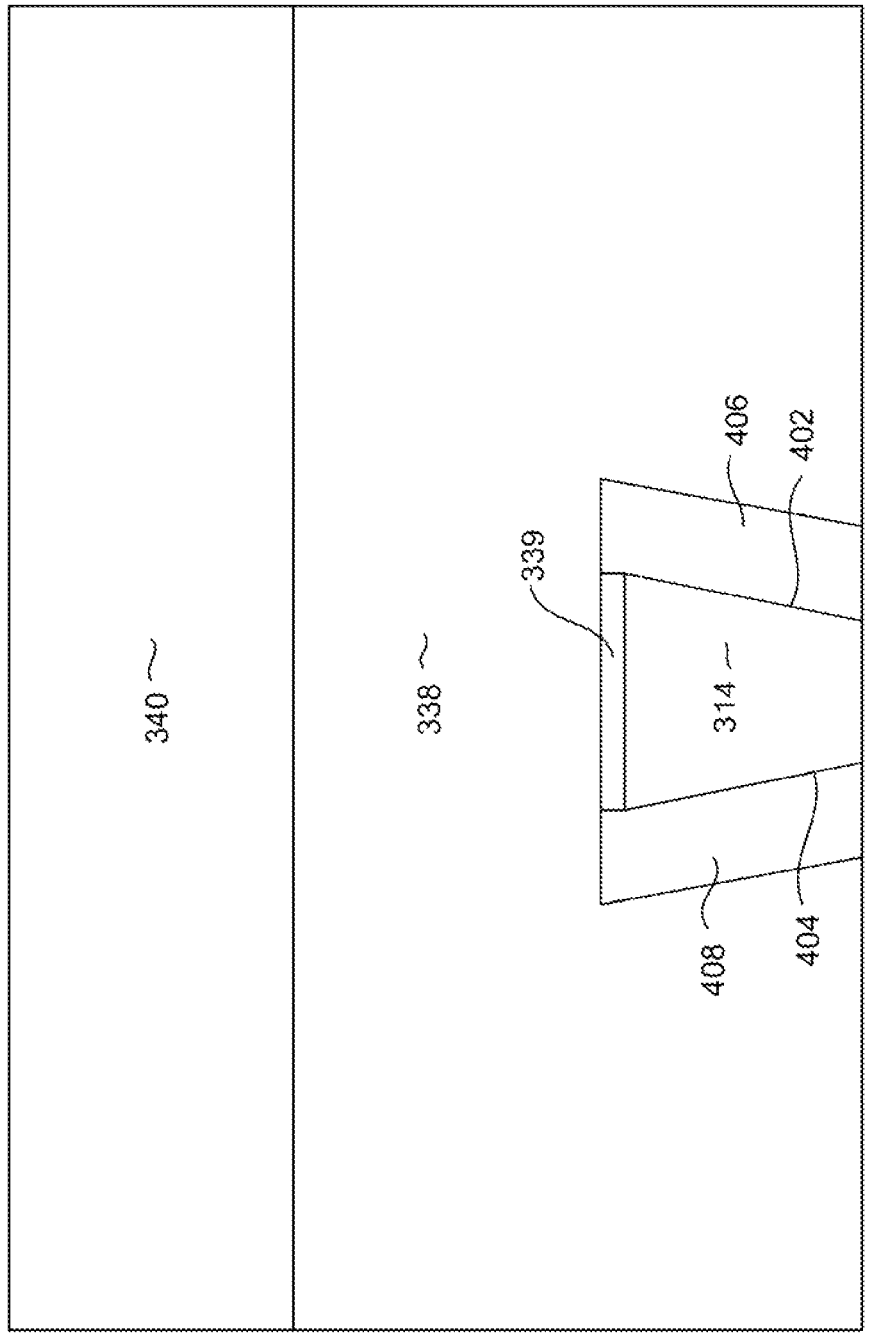
FIG. 4 is an air bearing surface view of a portion of the magnetic head of FIG. 3.
Figure 5:
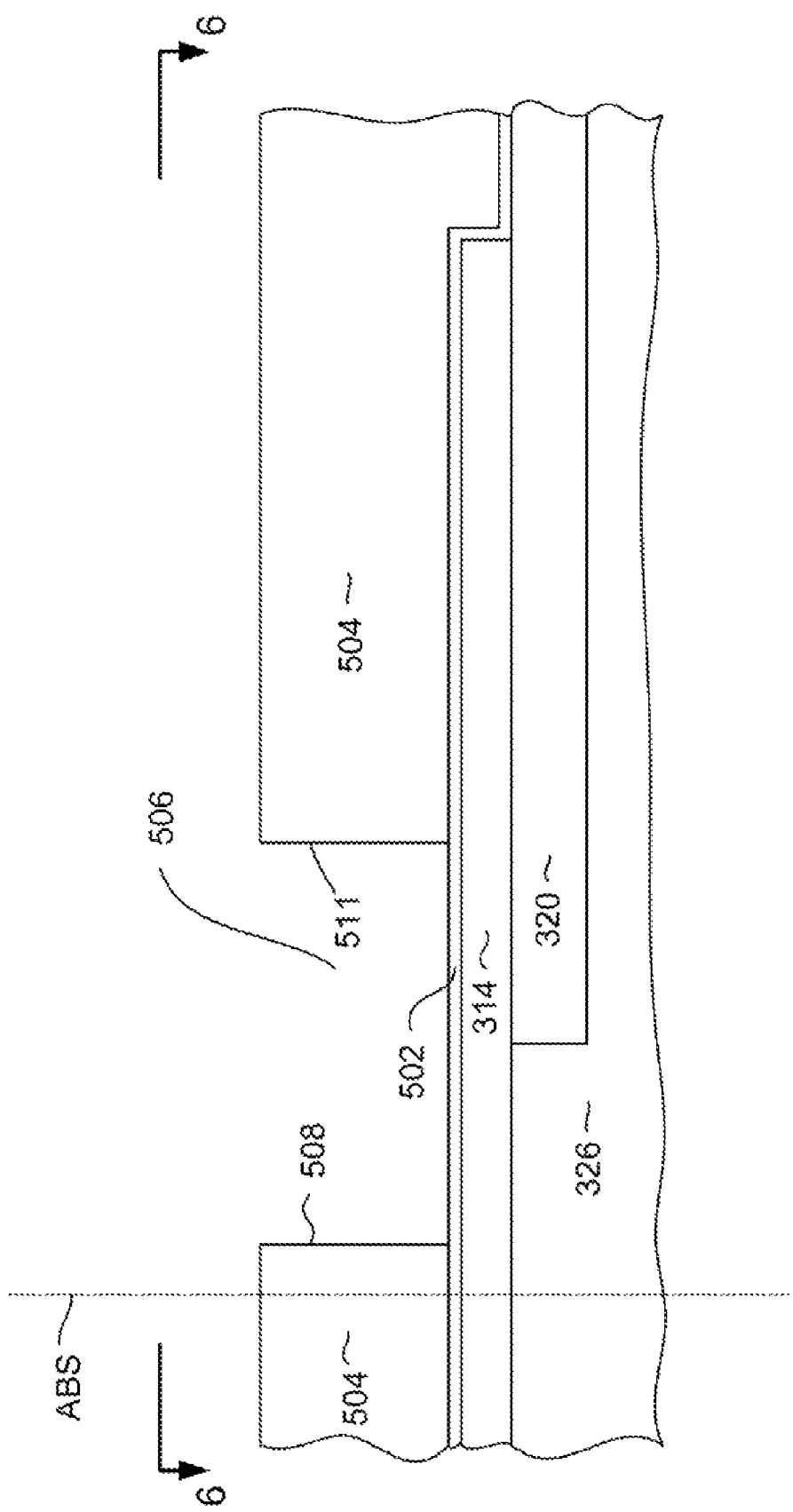
FIGS. 5-14 are views of a portion of a write head shown in various intermediate stages of manufacture, illustrating a method for manufacturing a write head according to an embodiment of the invention.

FIG. 4 shows a view of the write pole 314 and trailing shield 338 as viewed from the ABS. As can be seen, the trailing shield 338 can be configured as a wrap around shield (WAS) having side portions 402, 404 that extend down to shield the sides of the write pole. The side portions 402, 404 are separated from the sides of the write pole 314 by non-magnetic side gap layers 406, 408, which can be and usually are of a different thickness than the trailing gap. The side portions are beneficial in preventing stray fields from inadvertently writing to the magnetic medium 332 (FIG. 3). However, the shield 338 could be configured without such side portions, and the present invention would include such a design as well.

Referring again to FIG. 3, the presence of the trailing shield 338 can shunt magnetic flux from the write pole 314, which can reduce the strength of the write field propagating into the media 332. The trailing shield 338 has a novel tapered design that further maximizes both the field gradient and field strength. As can be seen, as viewed in cross section in FIG. 3 the trailing shield 338 has a tapered shape so that it is thinner in a leading direction (closer to the write pole 314) and wider in a trailing direction (further from the write pole 314). The thickness of the trailing shield 338 as viewed in cross section in FIG. 3 can also be referred to as the trailing shield throat height, and can be defined as the distance from the air bearing surface (ABS) to the back edge 342 of the trailing shield 338. The trailing shield throat height near the write pole 314, minimizes the amount of flux that is lost from the write pole 314 to the trailing shield 338. In addition, the gradually increasing trailing shield throat height, as the trailing shield travels away from the write pole 314 minimizes magnetic saturation of the trailing shield 338, which improves magnetic performance of the trailing shield 338 and improves the control of field gradient. A tapered non-magnetic bump layer 344 formed over the write pole 314 aids in forming the novel tapered shape of the trailing shield 338, as will be explained further below. The tapered non-magnetic bump 344 can be constructed of a material such as NiP.

Another important benefit of the tapered trailing shield 338, relates to the manufacture of the magnetic head 302. As those skilled in the art will appreciate, a head such as the head 302 is formed by depositing various layers onto a wafer. This wafer is sliced into rows of heads, and then a lapping process is performed to remove material (from the left as shown in FIG. 3) to define the air bearing surface (ABS). This lapping operation, then must be terminated once the desired ABS location has been reached.

As can be seen, then, the lapping operation defines the stripe height of the trailing magnetic shield. However, such lapping operations are difficult to control accurately. In addition, the manufacturing processes, such as photolithographic patterning of photoresist masks used to define the back edge 342 of the trailing shield 338 are also difficult to control with great accuracy. As a result, if a trailing shield were constructed without the tapered shape shown, but with a necessary thin trailing shield throat height, manufacturing variations and deviations can cause voids in the trailing shield (areas where the shield has been completely removed by the lapping process). Therefore, the tapered shape of the trailing shield 338 provides the necessary and desirable narrow throat height near the write pole 314, while providing greater material thickness away from the write pole to prevent such voids that might otherwise be caused by manufacturing variations.

Figure 6:
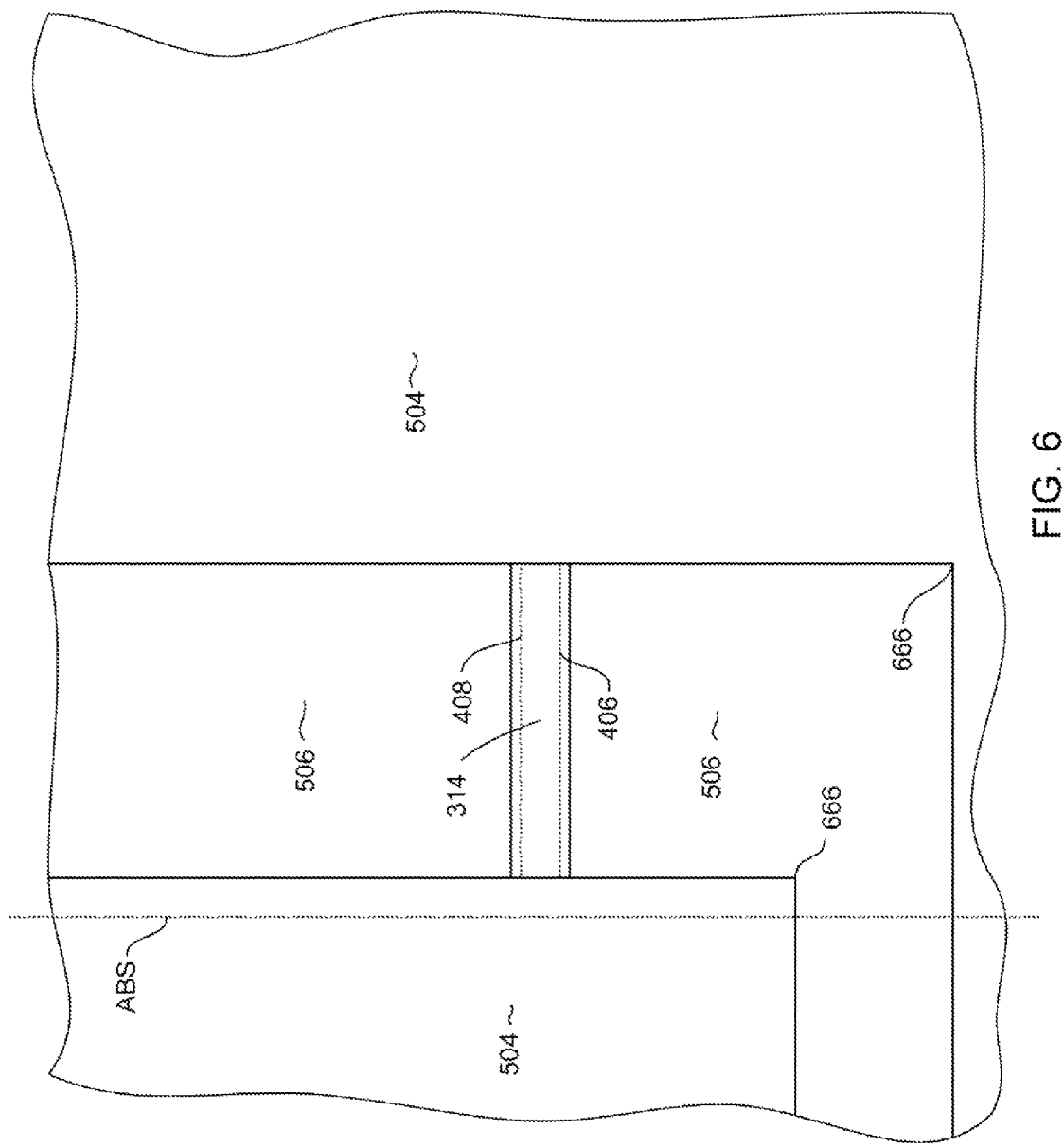
Figure 14:
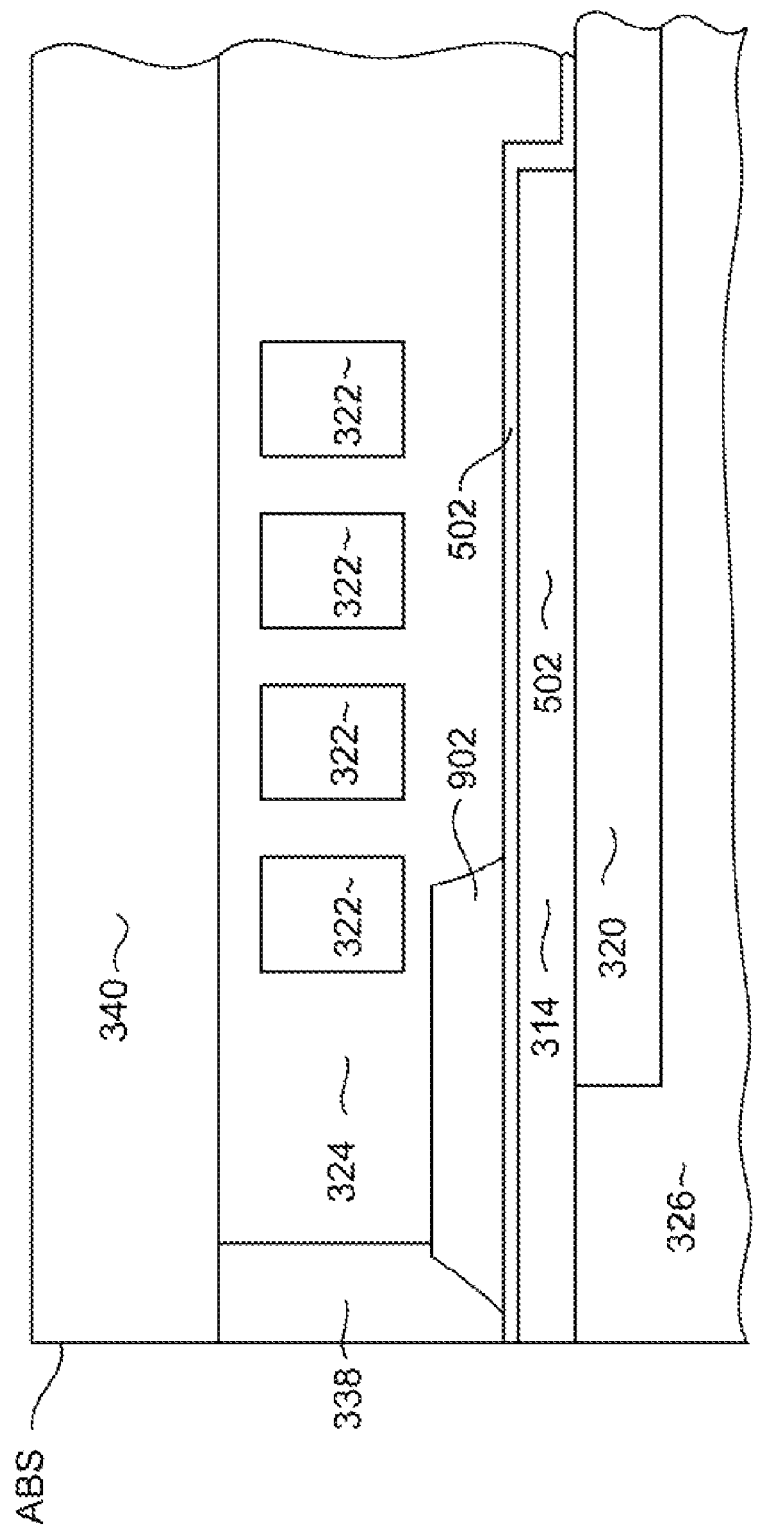

This novel, tapered trailing shield 338 can be formed by electroplating, using a unique and novel process that will be described below with reference to FIGS. 5-14. With particular reference to FIG. 14, the shaping layer 326 and write pole 314 are formed on a substrate such as the insulation layer 326. An electrically conductive seed layer 502 can then be deposited, and a first electroplating frame 504 is formed over the seed layer 502. The seed layer 502 can be formed of an electrically conductive, non-magnetic metal so that it can server as a trailing gap layer. However, this is optional. The electroplating frame 504 can be formed of a photolithographically patterned photoresist, and is formed with a trench 506 that has a front edge 508 and a back edge 511, that is located slightly behind a desired air bearing surface plane (ABS). The location of the front edge 508 will define the location of the trailing shield 338 (FIG. 3) nearest the write pole 314, as will be better understood below. FIG. 6 shows a top down view, and as can be seen, the trench 506 is relatively long, for reasons that will become more apparent below.

Figure 7:
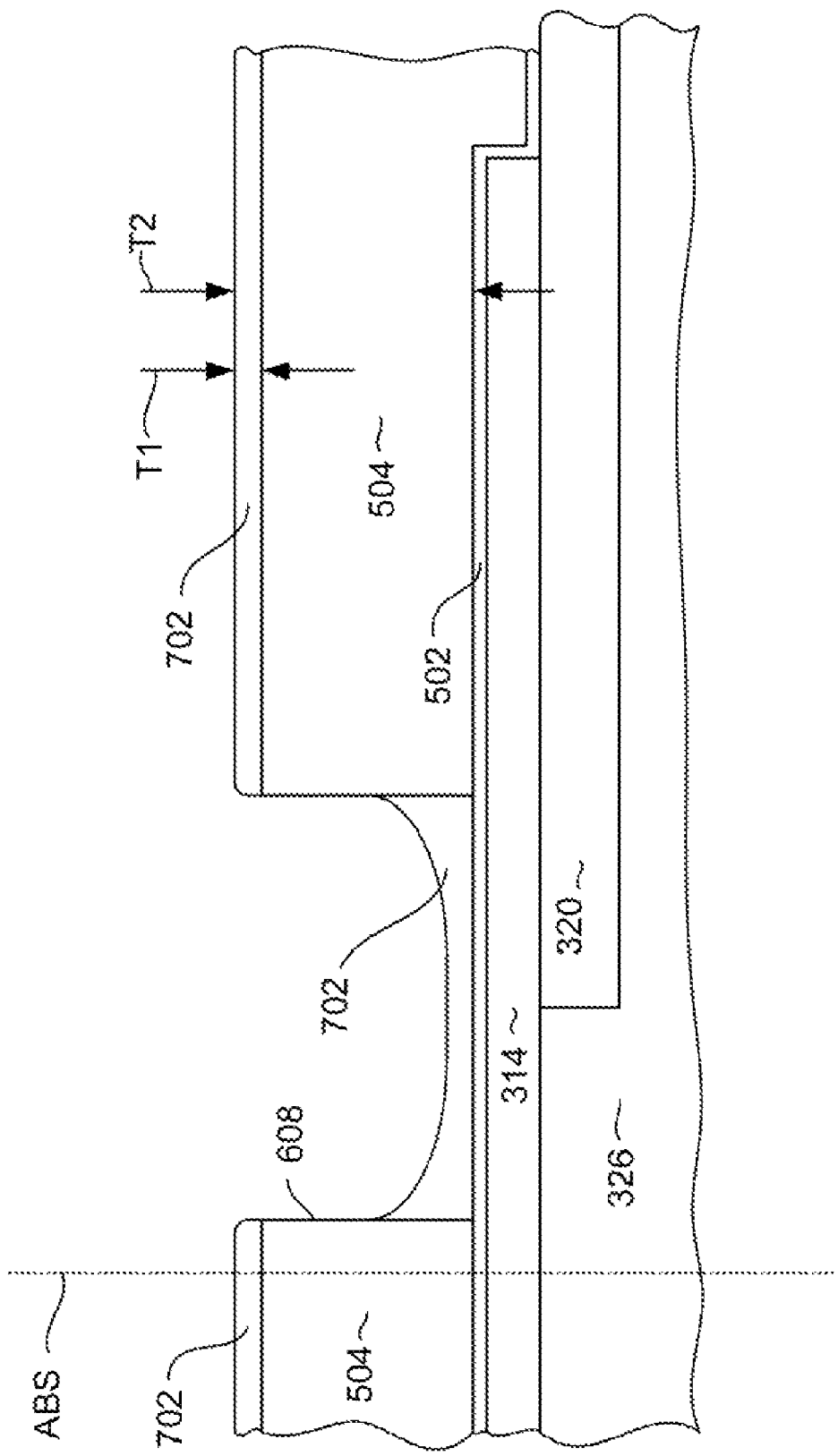

With reference now to FIG. 7, a layer of shrink material 702 is deposited. The shrink material can be a material such as SAFIER®, or more generally is a material that, when properly treated causes the photoresist plating frame 504 to be pulled inward toward the shrink material 702, as will be seen. Examples of possible shrink materials include an aqueous coating solution containing a water-soluble resin which is a copolymer of (A) acrylic acid, methacrylic acid or a combination thereof and (B) a water-soluble ethylenically unsaturated compound which is exemplified by N-vinylpyrrolidone, N-vinylimidazolidinone, methyl acrylate, methyl dimethylaminopropyl methacrylamide, N,N-dimethylaminopropyl acrylamide, N-methylacrylamide, diacetoneacrylamide, N,N-dimethylaminoethyl methacrylaminoethyl acrylate, N-acryloylmorphonile and the like, of which those nitrogen-containing water-soluble compounds are preferable, or a combination thereof.

The shrink material 702 could also be a water-soluble resin, which can be a copolymer of N-vinylpyrrolidone and water-soluble monomeric vinyl compound other than N-vinylpyrrolidone which is preferably N-vinylimidazolidone. The shrink material 702 can also be an aqueous coating solution containing a water-soluble resin in which is a copolymer of N-vinylpyrrolidone and a comonomer which is N-vinylimidazolidinone, N-acryloylmorphonoline or a combination thereof. Further examples of such materials are discussed in U.S. Pat. No. 6,811,817 to Sugeta et al., which is incorporated herein by reference. Although the Sugeta patent includes the use of a shrink material with a photoresist mask, the present invention uses a shrink material in a completely unique and novel way, in order to form a tapered, electroplated structure that, heretofore, could not be formed by electroplating alone.

With reference still to FIG. 7, the shrink material 702 is applied so that it is much thinner than the photoresist 504. Preferably the shrink material 702 is applied to a nominal thickness T1 that is 1 to 50 percent of the nominal thickness T2 of the photoresist plating frame 504 (ie. T1/T2=0.01–0.5), but preferably T1/T2=0.05. The materials chosen for the shrink material 702 and photoresist plating frame 504 are preferably chosen so that they have the same or nearly the same glass transition temperature, such as 90 to 150 degrees C. or preferably about 130 degrees C. A wicking or capillary action causes the shrink material 702 to rise up the side 608 of the photoresist frame.

Figure 8:
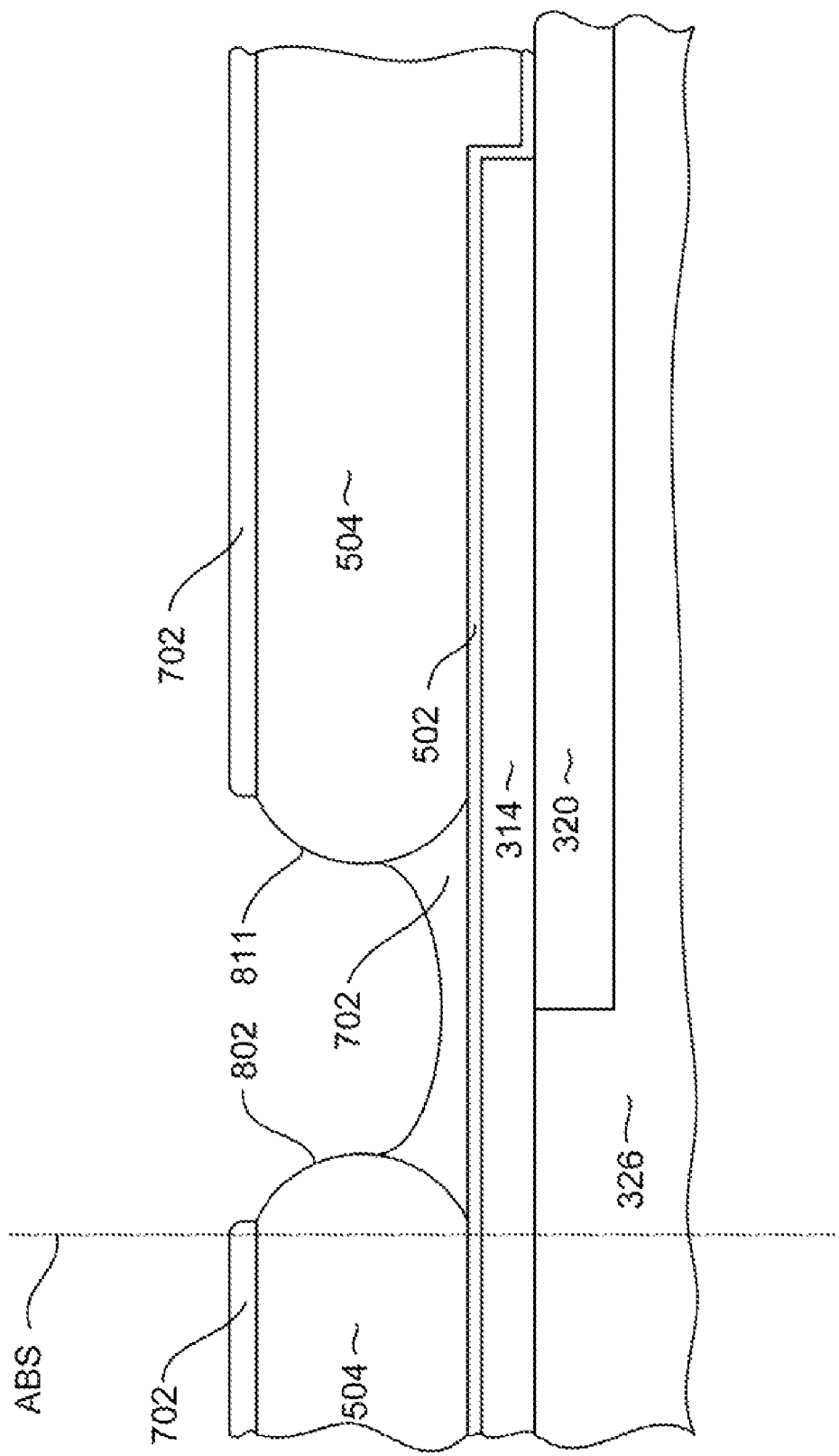

The structure thus formed, is then baked. The structure is preferably heated to a temperature that is at or near or slightly above the glass transition temperatures of the photoresist 504 and shrink material 702. For example, the structure can be heated to 90 to 140 degrees C. or more preferably around 130 degrees C., for a duration of about 1 to 3 minutes. This baking results in a structure as shown in FIG. 8. As can be seen, in FIG. 8, this heat treatment causes the shrink material 702 to pull on a bottom portion of the photoresist frame 504. This results in bulbous, rounded side walls 802 and 811 being formed as shown in FIG. 8. It should be pointed out that the deformation of one of sidewall 802 may not be symmetric or the same as another sidewall 811. The bottom of the photoresist frame 504 is bounded by its adhesion to the underlying seed layer 502 so it remains fixed at the point at which it was originally photolithographically patterned as described above with reference to FIG. 5.

After the heating process has been performed to deform the photoresist frame 504, the shrink material can be removed by a solvent such as water. It should be pointed out that the above steps of depositing a shrink material 702, heating, and removing the shrink material can be repeated one or more times. Each successive repeat of these steps further deforms the photoresist layer, however after several repeated steps, the photoresist mask 504 begins to crosslink so that further repetition of these steps produces less of an increase in deformation of the resist mask 504 and is thus harder to remove later with a solvent.

Figure 9:
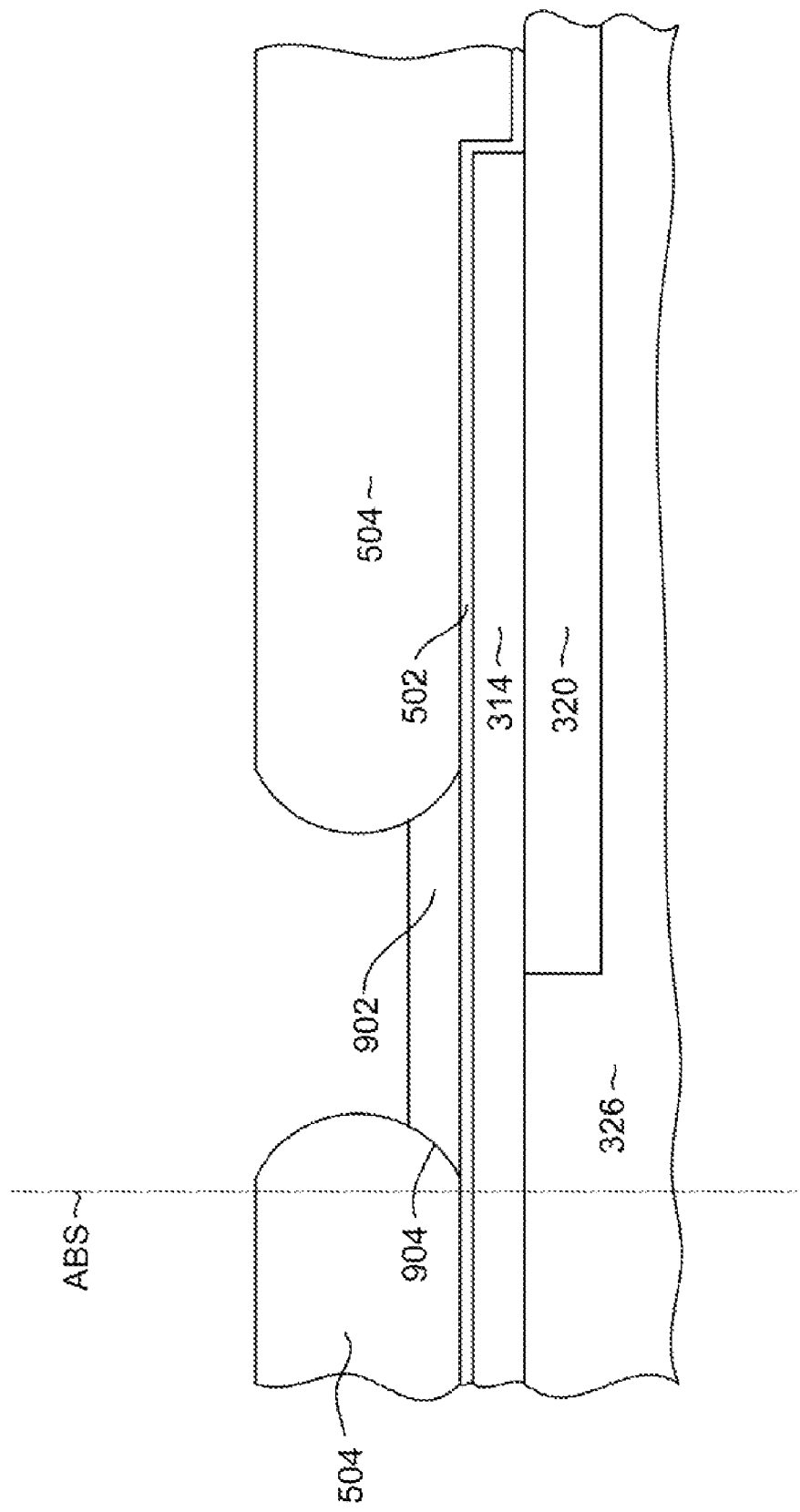

With reference now to FIG. 9, after removing the shrink material 702 (FIG. 8), a layer of non-magnetic, electrically conductive material 902 is deposited by electroplating, using the seed layer 502 as an electroplating seed. While various materials could be used, the non-magnetic, electrically conductive material is preferably a material such as NiP, preferably having a P content of about 10 percent, which assures that the layer 902 is non-magnetic. More generally, the non-magnetic layer 902 could be NiP, Cr, Cu or alloys thereof. The non-magnetic layer 902 is deposited much thinner than the photoresist mask 504 so that it only extends to a level below the overhang formed by the bulbous wall 802 of the photoresist 504. As can be seen, the bulbous shape of the wall 802 of the photoresist frame, causes the non-magnetic bump layer 902 to be formed with tapered edges 904.

Figure 10:
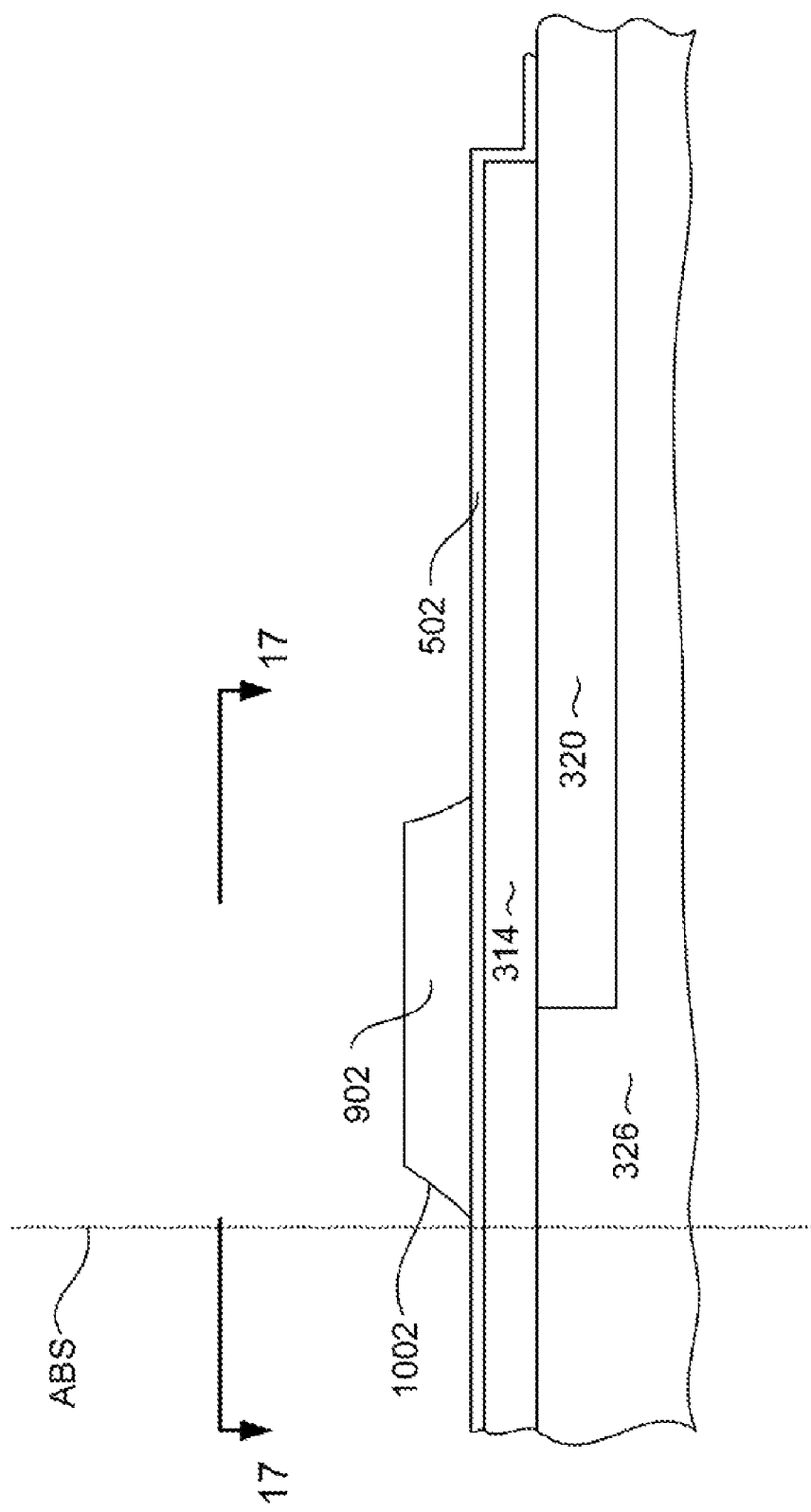

After the non-magnetic bump layer has been electroplated to a desired height, the photoresist frame 504 can be lifted off, leaving a structure such as that shown in FIG. 10. then, as can be seen, the forward-most point 1002 of the non-magnetic bump 902 can be close to, but behind the ABS plane. The distance between this forward-most point and the ABS plane will define the throat height of the trailing shield 338 (FIG. 3) at the location closest to the write pole 314.

Figure 11:
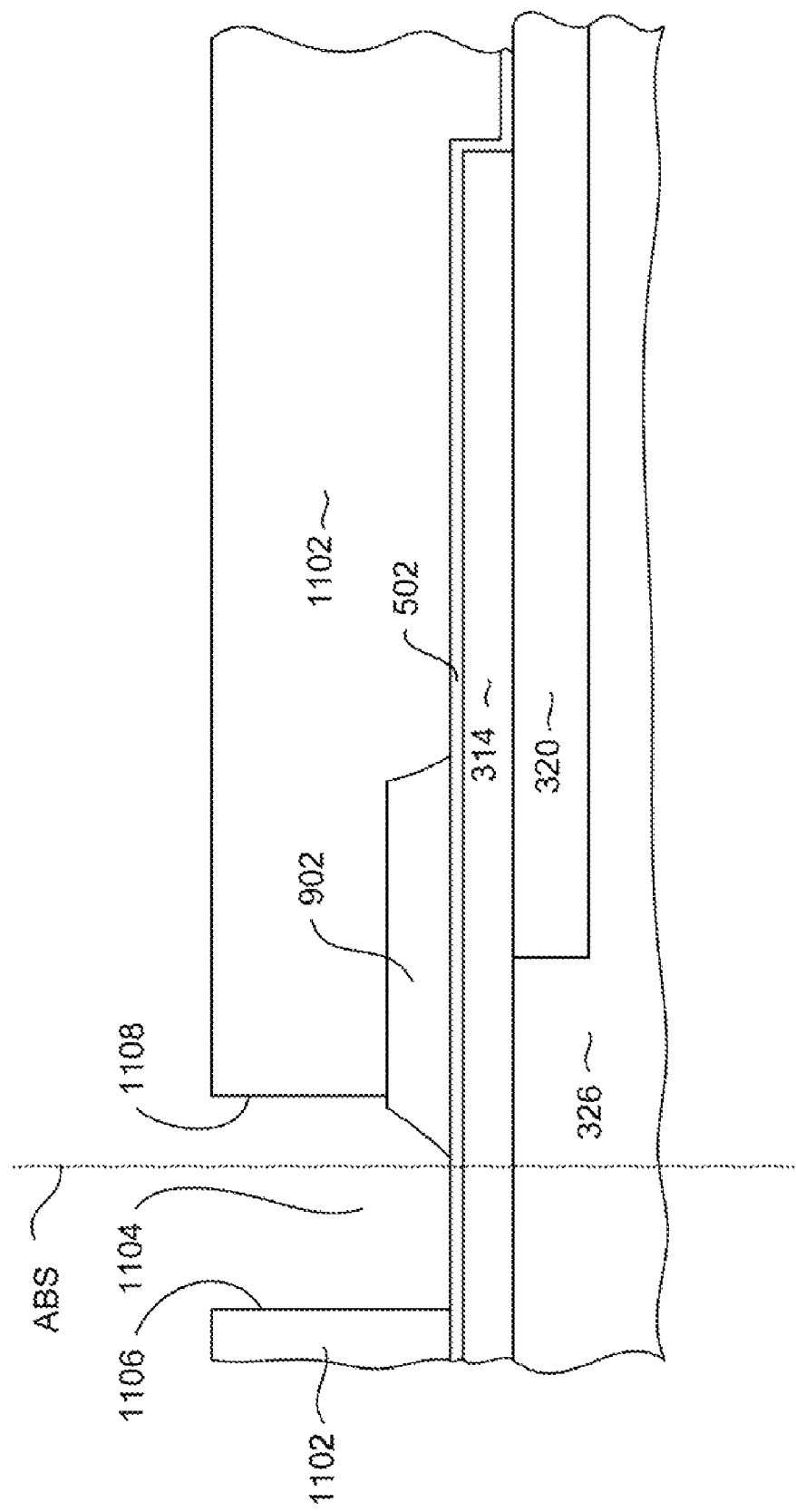

With reference now to FIG. 11, a second photoresist electroplating frame 1102 is formed by spinning on a layer of photoresist and photolithographically patterning and developing the photoresist to define an opening 1104 having a front edge 1106 located at some location in front of the ABS, and a back edge 1108 located at a desired location behind the ABS. The location of the back edge 1108 will determine an ultimate back edge (or secondary throat height) of the yet to be formed trailing shield 338 (FIG. 3).

Figure 12:
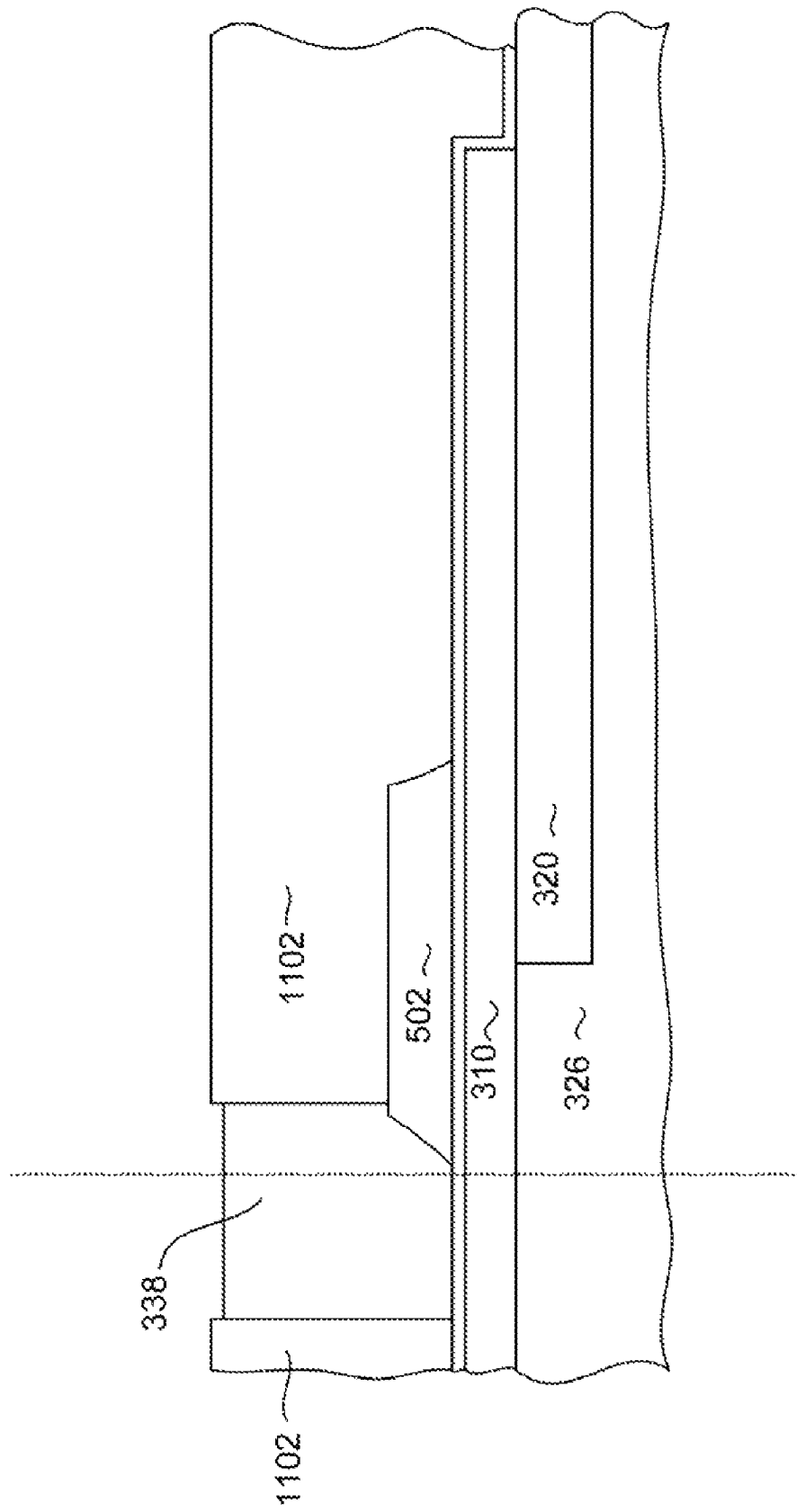
Figure 13:
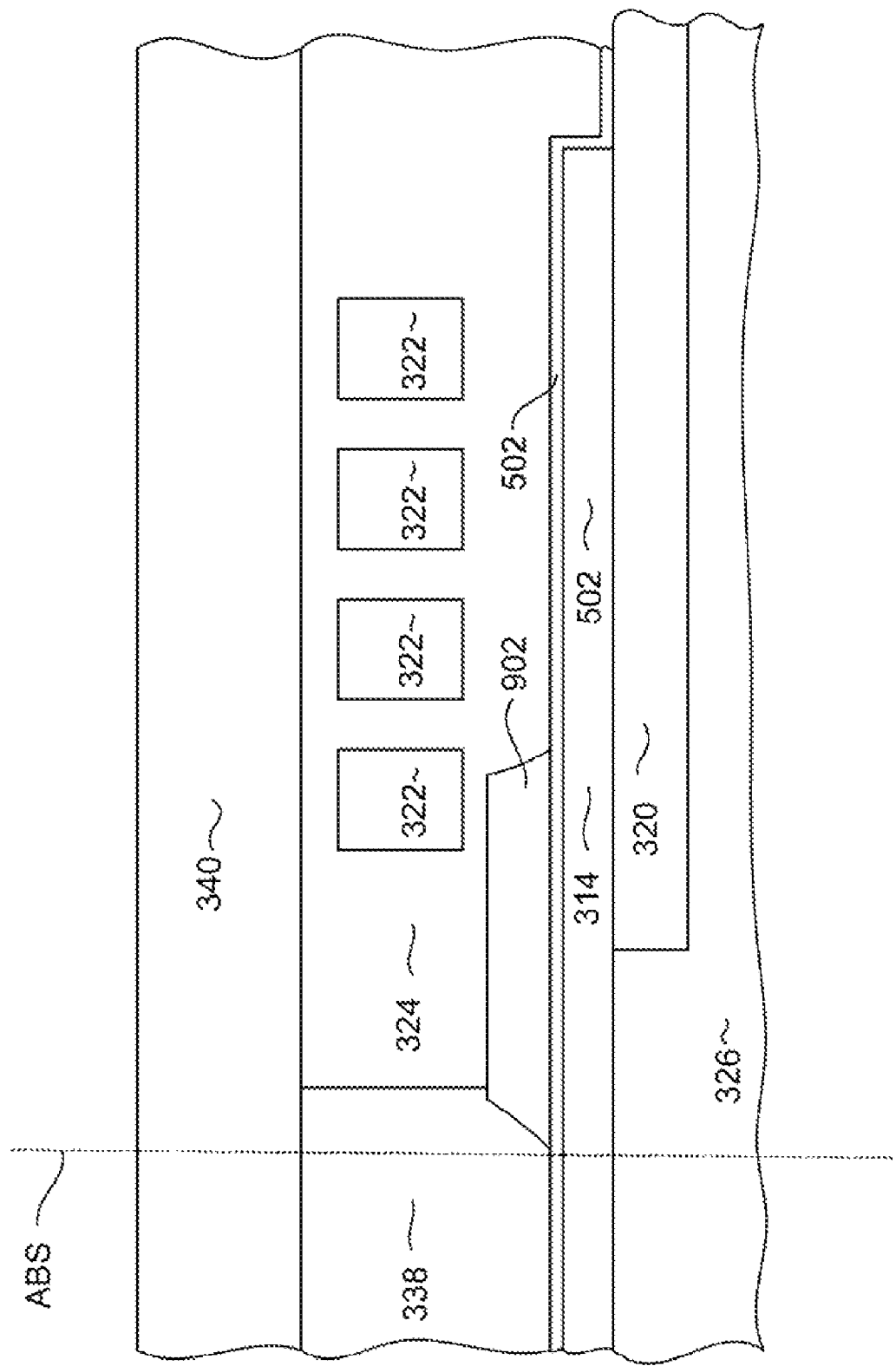

Then, with reference to FIG. 12, a magnetic material such as CoFe or CoFeX is electroplated into the opening in the photoresist mask, thereby forming a magnetic shield 338. The photoresist frame 1102 can then be lifted off. Then, with reference to FIG. 13, a write coil layer 322 can be formed within an insulation layer 324. A trailing return pole 340 can then be formed so as to contact the trailing magnetic shield 338 to provide a flux return path to the shaping layer 318 and back gap layer 318.

As those skilled in the art will appreciate, magnetic heads are formed on a wafer with many thousands of such heads being formed in rows on the wafer. The heads are cut into rows of wafers and a lapping operation is performed to define the air bearing surface. This lapping process removes material from the left side as viewed in FIG. 13, and continues until the desired ABS plane (ABS) has been reached. When the ABS plane has been reached, lapping stops, leaving a structure such as shown in FIG. 14. As mentioned above however, this lapping process is difficult to control with extreme accuracy. The tapered shape of the trailing shield 338 allows the trailing shield 338 to have a desired small throat height near the write pole 314, while having a much thicker throat height away from the write pole 314, to ensure that sufficient trailing shield material 338 remains after lapping (i.e. to ensure that no voids or holes are formed in the trailing shield 338 as a result of manufacturing variations. In addition, as mentioned above, the tapered shape results in a trailing shield having a desired small throat height near the write pole (to minimize flux loss) while also having a desired larger throat height away from the write pole 314 to prevent magnetic saturation of the write pole.

The above process for forming a tapered, electroplated structure has been described in terms of forming a tapered magnetic shield. However, the invention extends more broadly to the formation of tapered, electroplated structure generally. Such structures could be useful in the construction of magnetic heads, but could also be useful for constructing structures in other fields of manufacture as well.

Figure 15:
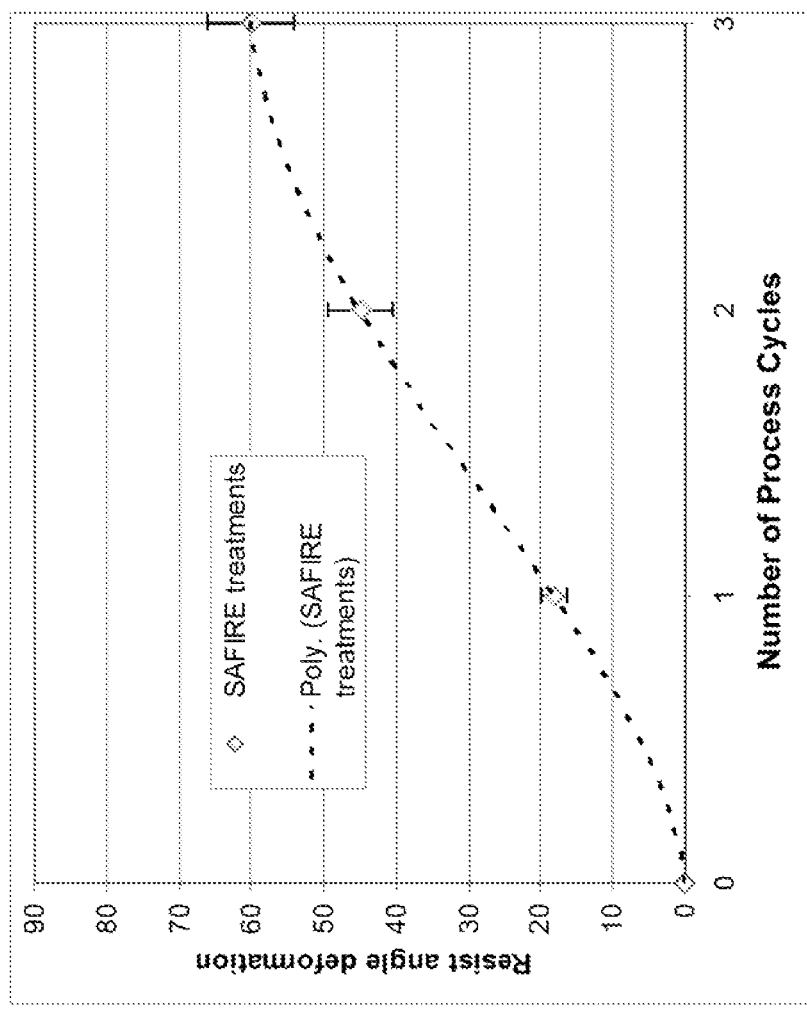
FIG. 15 is a graph illustrating a relationship between process cycles and photoresist deformation.

As mentioned above with reference, the processes described with reference to FIGS. 7 and 8 can be successively to increase the angle of the taper of the electroplated structure 902 in FIG. 9. FIG. 15 shows how the amount of deformation and taper increases with increased the number of cycles (deposition of shrink material 702, heating, and removal of the shrink layer 702). As can be seen the amount of further deformation decreases after about 3 cycles.

Also, as mentioned above with reference to FIG. 6, the trench 506 formed in the first photoresist frame preferably is preferably extended in the lateral directions. Therefore, the edge 508 and 511 is long. This avoids a puckering shape at the corners 666 of the tapered bump mask 504 from causing unintended deformation. As can be appreciated, the bulbous deformation of the photoresist mask 504 occurs uniformly at all sides of the opening. Therefore, at corners of a rectangular or square opening a puckering shape is formed. Moving these corners away from the sides of the plated structure 902 avoids having this puckering affect the structure of interest.

Figure 16:
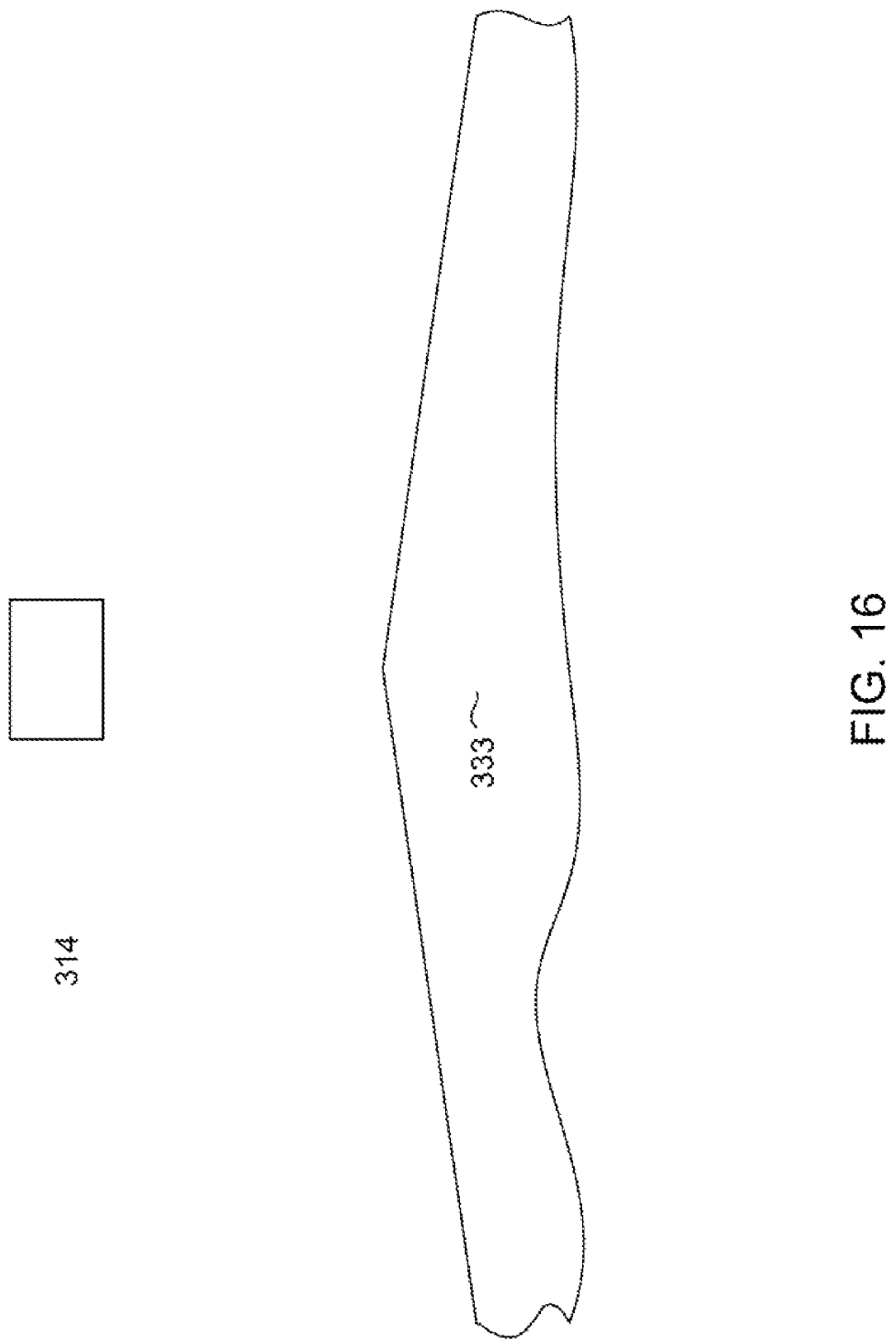
FIG. 16 is a cross sectional view of a portion of a write head structure according to an alternate embodiment of the invention.
Figure 17:
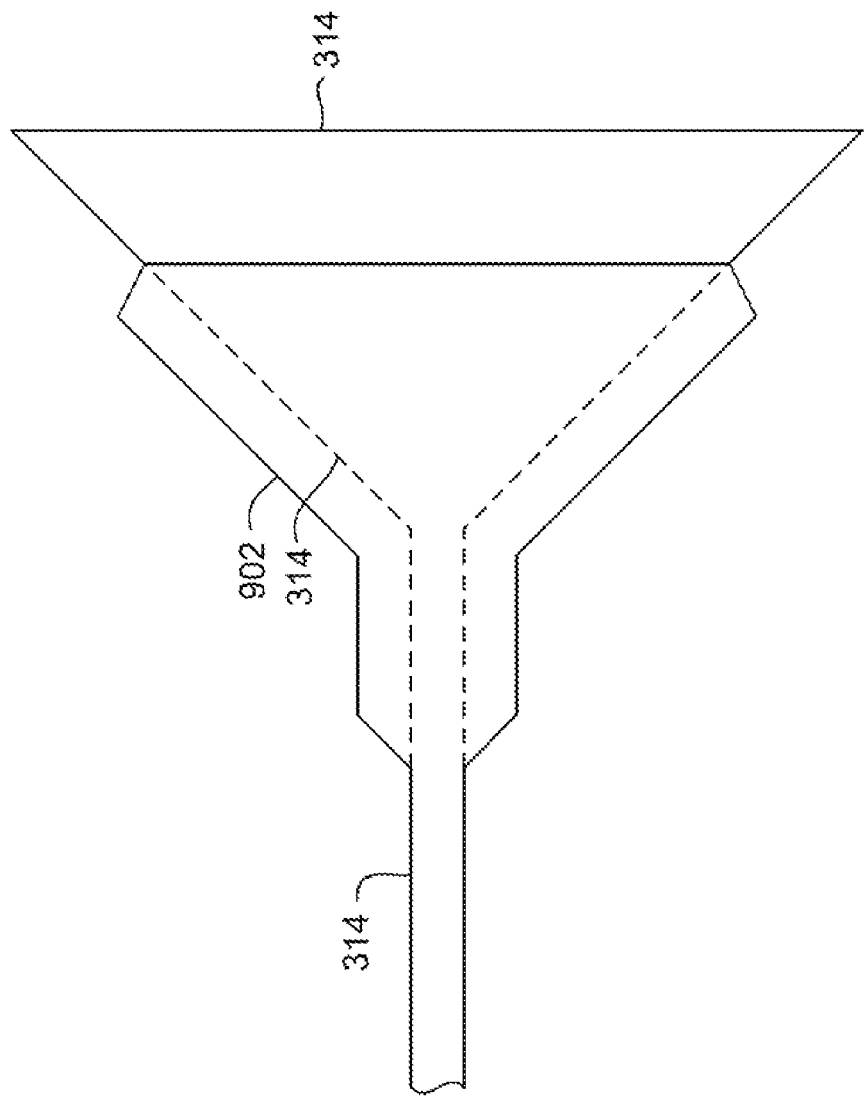
FIG. 17 is a top down view of a portion of a write head according to another embodiment of the invention.

Furthermore, an electroplated member could be suspended above the substrate in the form of a bridge. As an example, in FIG. 16, a pole 314 could be completely undercut via an etching process to create a void between an etching process to create a void between the pole 314 and a substrate layer 333 under the pole 314. Such a situation would look similar to FIG. 6 from a top down perspective. However if the electroplated member is a suspended feature and the plating resist is deformed as described earlier, then the plated feature will have a slant on the top and sides of the electroplated member. This is shown in FIG. 17. This will produce an electroplated layer that is conical in shape and in the plane of the substrate.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
    forming a magnetic write pole over a substrate;
    depositing an electrically conductive seed layer;
    forming a first photoresist mask having an opening and having a thickness;
    depositing shrink material, the shrink material having a thickness that is less than the thickness of the first photoresist mask;
    heating the first photoresist mask and shrink material to form the opening in the first photoresist mask with a bulbous side;
    removing the shrink material;
    electroplating a non-magnetic material into the opening in the first photoresist mask, the bulbous side of the first photoresist mask forming the electroplated non-magnetic material with a tapered edge;
    removing the first photoresist mask;
    forming a second photoresist mask having an opening configured to define a trailing magnetic shield; and
    electroplating a magnetic material into the opening in the second photoresist mask to from the trailing magnetic shield, at least a portion of the trailing magnetic shield being formed over the tapered edge of the non-magnetic material.

2. The method as in claim 1 wherein the non-magnetic layer comprises NiP, Cr, Cu or alloys thereof.

3. The method as in claim 1 wherein the thickness of the shrink material is 1-99% percent the thickness of the first photoresist mask.

4. The method as in claim 1 wherein the shrink material and the first photoresist mask each have glass transition temperatures that are both between 100-150 degrees C.

5. The method as in claim 4 wherein the heating of the first photoresist mask and shrink material comprises heating to a temperature near the glass transition temperatures of the first photoresist layer and shrink material.

6. The method as in claim 1 wherein the opening in the first photoresist mask extends laterally significantly beyond the write pole to prevent puckered corners of the first mask from distorting the electroplated non-magnetic material.

7. The method as in claim 1 wherein the shrink material comprises a water soluble resin compound.

8. The method as in claim 1, further comprising, before electroplating the non-magnetic material, repeating the steps of:
    depositing a shrink material;
    heating the first photoresist mask and shrink material; and
    removing the shrink material.

9. The method as in claim 8, wherein the steps of:
    depositing the shrink material;
    heating the first photoresist mask and shrink material; and
    removing the shrink material, are repeated multiple times.

10. A method for forming a tapered, electroplated structure, comprising:
    forming a photoresist mask having a thickness and configured with an opening having a side edge;
    depositing a shrink material, the shrink material being deposited to a thickness that is less than the thickness of the photoresist mask;
    heating the photoresist mask and the shrink material to deform the photoresist mask, forming the side edge with a bulbous shape;
    removing the shrink material;
    electroplating an electrically conductive material into the opening in the mask; and
    removing the mask and leaving an electroplated material with a tapered edge.

11. The method as in claim 10 further comprising; after electroplating the electrically conductive material into the opening in the mask:
    removing the mask;
    forming a second mask having an opening disposed over at least a portion of the electrically conductive material, and
    electroplating a second material into the opening in the second mask.

12. The method as in claim 11 wherein the electrically conductive material and the second electrically conductive material are different materials.

13. The method as in claim 11 wherein the electrically conductive material comprises a non-magnetic material and the second electrically conductive material comprises a magnetic material.

14. The method as in claim 10 wherein the shrink material is deposited to a thickness that is 1-99% the thickness of the photoresist mask.

15. The method as in claim 10 wherein the shrink material comprises a water soluble resin compound.

16. The method as in claim 10 wherein the electroplated material has an edge that is conical in shape.

17. The method as in claim 10 wherein the electrically conductive material comprises a bridge structure that is separated from the substrate.

* * * * *